United States Patent
Adolph et al.

(10) Patent No.: US 6,852,182 B1
(45) Date of Patent: Feb. 8, 2005

(54) HYDROLYZABLE PREPOLYMERS FOR EXPLOSIVE AND PROPELLANT BINDERS

(75) Inventors: Horst G. Adolph, Warrenton, VA (US); Michael E. Sitzmann, Adelphi, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 63 days.

(21) Appl. No.: 09/853,927

(22) Filed: May 9, 2001

Related U.S. Application Data

(63) Continuation of application No. 09/497,873, filed on Feb. 4, 2000, now abandoned.

(51) Int. Cl.[7] .......................... C06B 45/10; C08G 18/00
(52) U.S. Cl. ...................... 149/19.4; 149/19.5; 528/44; 522/182
(58) Field of Search ........................... 522/182; 528/44; 149/19.5, 19.6

(56) References Cited

U.S. PATENT DOCUMENTS

| | | | | |
|---|---|---|---|---|
| 4,293,352 A | * | 10/1981 | Lee et al. ................ | 149/19.4 |
| 4,374,241 A | * | 2/1983 | Adolph ...................... | 149/19.4 |
| 4,415,728 A | * | 11/1983 | Tremblay .................... | 528/279 |
| 4,453,860 A | * | 6/1984 | Brachert et al. .............. | 149/11 |
| 4,456,493 A | * | 6/1984 | Barnes et al. ............... | 149/19.4 |
| 4,458,064 A | * | 7/1984 | Chatterjee ................... | 528/501 |
| 4,524,102 A | * | 6/1985 | Hostettler ................ | 428/318.8 |
| 4,555,277 A | * | 11/1985 | Scribner ..................... | 149/19.4 |
| H000351 H | * | 10/1987 | Kim et al. ................... | 528/266 |
| 4,751,272 A | * | 6/1988 | Okita et al. ................. | 525/398 |
| 4,799,980 A | * | 1/1989 | Reed, Jr. .................... | 149/19.4 |
| 4,988,397 A | * | 1/1991 | Adolph et al. ............. | 149/19.3 |
| 5,458,706 A | * | 10/1995 | Finck et al. ................ | 149/19.2 |
| 5,525,654 A | * | 6/1996 | Podola et al. ................. | 528/30 |
| 5,554,709 A | * | 9/1996 | Emmerling et al. .......... | 528/27 |
| 5,872,158 A | * | 2/1999 | Kuczynski ................... | 522/182 |
| 5,904,980 A | * | 5/1999 | Rivas .......................... | 428/362 |
| 6,395,859 B1 | * | 5/2002 | Stern et al. .................... | 528/44 |
| 6,444,777 B1 | * | 9/2002 | Genz et al. ................... | 528/60 |

* cited by examiner

Primary Examiner—Aileen Felton
(74) Attorney, Agent, or Firm—Mark Homer

(57) ABSTRACT

A degradable prepolymer for explosive and propellant compositions having increased hydrolyzability comprising at one —O—$CH_2$—O— linkage within the backbone of the prepolymer. The degradable prepolymer is useful as a binder for explosive and propellant compositions.

2 Claims, No Drawings

HYDROLYZABLE PREPOLYMERS FOR EXPLOSIVE AND PROPELLANT BINDERS

This application is a continuation of application Ser. No. 09/497,873, filed Feb. 4, 2000, now abandoned.

The invention described herein may be manufactured and used by or for the government of the United States of America for governmental purposes without the payment of any royalties thereon or therefor.

BACKGROUND OF THE INVENTION

1. Field of the Invention

The present invention includes chemically curable prepolymers used in binders for explosives and propellants. More particularly, the prepolymers include a formal component to increase the hydrolyzing properties of the prepolymers and formed binders from the prepolymers. The prepolymers and binders are easily degraded to recover explosive/propellant chemical components.

2. Brief Description of the Related Art

Chemically cured binders currently used in explosives and propellants are difficult to degrade at the end of their life-cycle. With the lack of easy degradation, the recovery of valuable components of the energetic composition is hindered.

Several types of binders are known in explosives and propellants. Polybutadiene or polyether structures contain no readily degradable groups. Binders containing ester groups alone, such as polycaprolactone or carboxy-terminated prepolymers cured with epoxides, possess hydrolyzable ester groups, but the conditions for hydrolysis, i.e., time, temperature, are severe.

There is a need in the art to provide binders for energetic materials with prepolymers containing more readily hydrolyzable moieties in the backbone to improve the degradability of explosive and propellant binders. The present invention addresses this and other needs.

SUMMARY OF THE INVENTION

The present invention includes a degradable prepolymer for explosive and propellant compositions having increased hydrolyzability comprising at least one —O—CH$_2$—O— linkage within the backbone of the prepolymer.

The invention also includes a degradable polymer product formed by the process comprising the steps of providing a degradable prepolymer for explosive and propellant compositions having increased hydrolyzability comprising at least one —O—CH$_2$—O— linkage within the backbone of the prepolymer and curing the degradable prepolymer with a polyisocyanate.

Additionally, the present invention includes a degraded polymer product formed by the process comprising the steps of providing a degradable prepolymer for explosive and propellant compositions having increased hydrolyzability comprising at least one —O—CH$_2$—O—linkage within the backbone of the prepolymer and reacting the degradable prepolymer with a degrading chemical composition.

DETAILED DESCRIPTION OF THE PREFERRED EMBODIMENT

The present invention includes degradable prepolymers used to form binders in explosive and propellant compositions. The degradable prepolymers have increased hydrolyzability resulting from the incorporation of a formal unit, or —O—CH$_2$—O— structure, within the backbone of the prepolymers. The prepolymers containing hydrolyzable groups within the polymer chain are used to create the binders, while providing hydroxy groups at the prepolymer chain ends. By chemically curing the hydrolyzable prepolymers, binders are created that are useful in energetic materials, such as explosives and propellants. The prepolymers comprise non-energetic materials.

The present invention provides formal prepolymers with improved hydrolyzability, which may be adjusted for particular needs. As such, the ease of hydrolyzability of the prepolymers, or formed binders, is adjustable for particular uses directed to specific shelf-life, degradability, type of explosive, ease of use, and other like operational factors for explosives or propellants, with the proper degree of hydroyzability for a particular use determinable by those skilled in the art.

In general terms, the polyformals are made by condensation of diols with formaldehyde and contain the formal group as the hydrolyzable moiety, as shown in equation 1, below:

$$HO-R-OH \xrightarrow{(CH_2O/H^*)} H(O-R-OCH_2)_nO-R-OH \quad (1)$$

with R representing a carbon or carbon/heteroatom chain, and n representing the number of repeat units.

EXAMPLES

Examples 1 and 2 show the preparation of the prepolymers of the present invention which are useful to form binders for explosives and propellants. The hydrolyzability of the uncured prepolymers was tested by stirring a sample dissolved in water or, when not water-soluble, in dichloromethane or tetrahydrofuran, with 1.0 N hydrochloric acid at room temperature. After approximately 24 hours, the molecular weight of the recovered material was determined by gel permeation chromatography (GPC) analysis. Examples 3 and 4 show that the prepolymers are curable with a conventional polyisocyanate such as Desmodur N-100.

Example 1

Preparation of Poly(PEG-400 formal) (hydroxy-terminated)—A mixture of 10.0 g of polyethyleneglycol (molecular weight 400, PEG-400) and 0.75 g of trioxane was cooled with ice, and 3.0 mL of borontrifluoride etherate was added dropwise with stirring. The mixture was allowed to warm to room temperature (approximately 20° C.) and stirring was continued for a total of 24 hours. The mixture was diluted with 25 mL of ether, poured into a solution of 5 g of sodium hydrogencarbonate and 3 mL of 30% hydrogen peroxide in 50 mL of water, and the total stirred vigorously for 1 hour. The phases were separated, the aqueous phase was saturated with sodium chloride and extracted with 25 mL of ether, the combined ether phases were dried with magnesium sulfate and stripped on a rotary evaporator to give 9.5 g. (92%) of a colorless oil. Gel permeation chromatography (GPC) analysis and comparison with poly (ethyleneglycol) standards showed the peak molecular weight of this polymer to be approximately 3,500.

Example 2

Preparation of Poly(PCL-500 diol formal) (hydroxy-terminated)—A mixture of 7.36 g of poly(caprolactone)diol (molecular weight 530, PCL-500), 0.42 g of p-formaldehyde, and 3.5 mL of dichloromethane was cooled in an ice-bath, and 1.39 mL of boron trifluoride etherate was added with stirring. The mixture was stirred at room temperature (approximately 20° C.) for 24 hours, was diluted with 20 mL of dichloromethane, poured into a solution of 2.8 g of sodium hydrogen carbonate in 28 mL of water, and the total agitated for 0.5 hours. The dichloromethane phase was dried with magnesium sulfate and freed from solvent to give 7.5 g (100%) of a light brown oil which solidified on standing. GPC analysis and PEG standards indicated a peak molecular weight of 3,600.

Example 3

Curing of Poly(PEG-400 formal) with Desmodur N-100—The polymer obtained in Example 1 was used in an amount of 1.0 g and was mixed with 1 g of di-n-butylphthalate, 0.005 g of triphenylbismuth, and 0.136 g of Desmodur N-100 (NCO:OH ratio 1.1:1+10% excess NCO). The mixture was stirred with a glass rod until homogeneous and was then stored at 65° C. After 4 days, an elastomeric gumstock had formed.

Example 4

Curing of Poly(PCL-500 diol formal) with Desmodur N-100—The polymer obtained in Example 2 was used in an amount of 1.03 g and was mixed with 1 g of di-n-butylphthalate, 0.005 g of triphenylbismuth, and 0.136 g of Desmodur N–100 (NCO:OH ratio 1.1:1+10% excess NCO). The mixture was stirred with a glass rod until homogeneous and was then stored at 65° C. After 4 days, an elastomeric gumstock had formed.

The prepolymers forming the binder comprise molecular weights suitable for processing, while enabling the formed binder to provide sufficient structural integrity to bind explosive and/or propellant compositions. The molecular weight of the prepolymers may range, for example, from about 2,000 to about 10,000; 2,500 to about 9,000; or 3,000 to about 8,000, with the proper molecular weight determinable by those skilled in the art for specific polymers and types of compositions. Monomer units within the prepolymers typically may range in molecular weight, for example, of from about 300 to about 1000; or about 400 to about 500. For the prepolymer, typically from about two to about ten —O—CH$_2$—O— linkages; or from about five to about eight —O—CH$_2$—O— linkages are used within the backbone of the prepolymer.

Preferred hydroxy-terminated prepolymers include poly (PEG-400 formal) having a polyethylene glycol component with a molecular weight of about 400 and poly(PCL-500 diol formal) having a polycaprolactone component with a molecular weight of about 500. Poly(PEG-400 formal) was shown to hydrolyze completely upon treatment with 1 N hydrochloric acid at room temperature for 24 hours. The ease of the hydrolysis of the poly(PEG-400 formal) was found to be greater than that of poly(PCL-500 diol formal), however the poly(PCL-500 diol formal) was found to have excellent hydrolyzability.

When forming binders for energetic materials, the curing agent must be capable of reacting with the terminal groups on the prepolymers. With the hydroxyl terminal groups, the di- or polyisocyanates are the preferred curing agents. Examples of suitable isocyanates include arylene polyisocyanates such as toluene diisocyanates; meta-phenylene diisocyanate; 4-chloro-1,3-phenylene diisocyanate; methylenebis-(4-phenyl isocyanate); 1,5-naphthalene diisocyanate; 3,3'-dimethoxy -4,4'-biphenylene diisocyanate; 3,3'-diphenyl-4, 4'-biphenylene diisocyanate; triphenylmethane triisocyanate; and alkylene poly-isocyanates such as methylene; ethylene; propane-1,2; butane-1,3; hexane-1,6 and cyclohexane-1,2 diisocyanates. Mixtures of polyisocyanates may also be used. Isophoron diisocyanate (IPDI) and Desmodur N-100 isocyanate curing agent, a commercial product of the Bayer Corp., Pittsburgh, Pa., are most often used. The formed prepolymers possess a functionality suitable for curing with isocyanates, with a preferred functionality of from about 1.7 to about 2.3, more preferably with a functionality of approximately 2.

The prepolymers of the present invention are hydrolyzable by the action of dilute aqueous acid at room temperature. Degradation of the prepolymers or formed binders may be performed by contact with an acidic degrading chemical composition, such as a dilute acid. Contact between the prepolymers and degrading composition is enhanced with agitation, such as stirring or mixing. The dilute acid may include suitable concentrations, such as from about 2.0 N or less, 1.5 N or less, or 1.0 N or less, with the proper concentration for a particular polymer or binder determinable by those skilled in the art.

Polymers of the present invention permit convenient processing of explosives or propellant that have outlasted their useful shelf life. The present invention provides telechelic poly(ethyleneglycol) and poly(caprolactone) polymers with hydrolyzable formal groups in the backbone that can be degraded by the action of dilute acidic compositions.

The foregoing summary, description, and examples of the present invention are not intended to be limiting, but are only exemplary of the inventive features which are defined in the claims.

What is claimed is:
1. A hydrolyzable prepolymer for explosive and propellant compositions, comprising the general formula

H(O—R—OCH$_2$)$_n$O—R—OH wherein R is a carbon chain or carbon and heteroatom chain monomer unit, the monomer unit having a molecular weight of from about 300 to about 1000;

wherein n is a numeral ranging from about 5 to about 8; and, wherein the —O—CH$_2$—O— within a backbone of the prepolymer is a hydrolyzable moiety, being hydrolyzable at room temperature using an acid having a concentration of about 2.0 N.

2. The hydrolyzable prepolymer of claim 1, wherein the prepolymer is poly(polycaprolactone-500 diol formal) having a molecular weight of about 3600.

* * * * *